(12) United States Patent
Van Der Donk et al.

(10) Patent No.: US 10,808,397 B2
(45) Date of Patent: Oct. 20, 2020

(54) HOUSING UNIT (71) Applicant: BAO HOUSE NV, Mol (BE)

(72) Inventors: Axel Van Der Donk, De Pinte (BE); Benjamin Eysermans, Mol (BE)

(73) Assignee: BAO HOUSE NV, Mol (BE)

( * ) Notice: Subject to any disclaimer, the term of this patent is extended or adjusted under 35 U.S.C. 154(b) by 0 days.

(21) Appl. No.: 16/328,871

(22) PCT Filed: Sep. 1, 2017

(86) PCT No.: PCT/EP2017/072003
§ 371 (c)(1),
(2) Date: Feb. 27, 2019

(87) PCT Pub. No.: WO2018/042012
PCT Pub. Date: Mar. 8, 2018

(65) Prior Publication Data
US 2019/0186123 A1     Jun. 20, 2019

Related U.S. Application Data

(60) Provisional application No. 62/382,350, filed on Sep. 1, 2016.

(51) Int. Cl.
| E04B 1/348 | (2006.01) |
| E04H 1/00 | (2006.01) |
| G06Q 10/08 | (2012.01) |
| G06Q 50/08 | (2012.01) |

(52) U.S. Cl.
CPC ......... *E04B 1/34869* (2013.01); *E04H 1/005* (2013.01); *G06Q 10/0875* (2013.01); *G06Q 50/08* (2013.01)

(58) Field of Classification Search
CPC ..... E04B 1/34869; E04H 1/005; G06Q 50/08; G06Q 10/0875
See application file for complete search history.

(56) References Cited

U.S. PATENT DOCUMENTS

| 4,078,342 | A | * | 3/1978 | Cohen ..................... A47B 77/02 312/198 |
| 5,626,404 | A | * | 5/1997 | Kelley ................... A47B 47/02 312/198 |
| 6,457,281 | B1 | * | 10/2002 | Teron .................. E04B 1/34861 52/126.3 |
| 7,016,747 | B1 | * | 3/2006 | Ninomiya ............... G06F 19/00 700/97 |

(Continued)

FOREIGN PATENT DOCUMENTS

| JP | H0355459 U | 5/1991 |
| JP | 2529832 Y2 | 3/1997 |

OTHER PUBLICATIONS

International Search Report from PCT Application No. PCT/EP2017/072003, dated Nov. 14, 2017.

*Primary Examiner* — Joshua K Ihezie
(74) *Attorney, Agent, or Firm* — Workman Nydegger (57) ABSTRACT

A housing unit includes a first super-entity, the SAM super-entity, which comprises active entities and/or active components. The SAM super-entity comprises a lower plinth system, an upper plinth system, and a plurality of cupboard modules arranged between the lower plinth system and the upper plinth system which form the structure of the SAM super-entity.

6 Claims, 5 Drawing Sheets

3D view of SAM (56) References Cited

U.S. PATENT DOCUMENTS

| | | | |
|---|---|---|---|
| 9,428,927 B2 | 8/2016 | Vale et al. | |
| 2005/0193643 A1* | 9/2005 | Pettus | C12M 37/00 52/79.1 |
| 2014/0013678 A1* | 1/2014 | Deverini | B29C 44/1233 52/79.1 |
| 2014/0036442 A1* | 2/2014 | Giannoglou | H05K 7/186 361/695 |
| 2015/0240475 A1* | 8/2015 | Malakauskas | E04B 1/34838 52/79.13 |
| 2019/0186122 A1* | 6/2019 | Patterson | E04B 7/18 |

* cited by examiner

Figure 1

Figure 2a: example of SAM and passive shell

Figure 2b: 3D view of SAM

Figure 3: the plinth boxes with their conduits

Figure 4: The entities of the SAM

Figure 5: Design and implementation flowchart

Figure 6

HOUSING UNIT

FIELD OF THE INVENTION

The present invention generally relates to the field of housing units, more particularly housing units comprising modular elements.

BACKGROUND OF THE INVENTION

Such housing units comprising modular elements, also referred to as modular housing units, are for example known from US2015240475. There however remains a need for such a modular housing unit which can be designed, manufactured and installed more efficiently as compared with traditional building methods.

SUMMARY

According to a first aspect of the invention there is provided a housing unit comprising a first super-entity, the SAM super-entity, which comprises active entities and/or active components, CHARACTERIZED IN THAT the SAM super-entity comprises a lower plinth system and/or an upper plinth system; and further comprises a plurality of cupboard modules arranged between the lower plinth system and the upper plinth system which form the structure of the SAM super-entity.

In this way there is realized a modular housing unit which can be build and installed more efficiently than with traditional building methods. SAM is the non-limiting acronym for Smart Adaptive Module. Preferably the SAM super-entity comprises all active entities and/or active components of the housing unit.

According to an embodiment, there is provided a housing unit, wherein the structure of the SAM super-entity is entirely formed by the plurality of cupboard modules, and/or the cupboard modules form at least one internal wall of the housing unit.

According to an embodiment, there is provided a housing unit, wherein the cupboard modules comprise a width and a depth, which corresponds to a predetermined standard distance or an integer multiple thereof.

According to an embodiment, there is provided a housing unit, wherein the SAM super-entity further comprises one or more conduits configured to respectively couple the active components to an associated utility, and wherein the one or more conduits 18 are at least partly arranged in the lower plinth system and/or the upper plinth system.

According to an embodiment, there is provided a housing unit, wherein the housing unit further comprises a second super-entity, the passive shell super-entity, which only comprises passive entities and/or passive components.

According to an embodiment, there is provided a housing unit, wherein at least a part of the plurality of cupboard modules are arranged in such a way that they form an interior wall of the housing unit.

According to an embodiment, there is provided a housing unit, wherein:
the active entities comprise one or more of the following:
   a kitchen;
   a bathroom;
   a restroom or toilet;
the active components comprise one or more of the following:
   an electric device;
   a ventilation unit,
   a cooking device;
   a washing device;
   a heating device;
   an air conditioning device
   a Heating, ventilation, and air conditioning or HVAC device;
   an information and/or telecommunication device;
   a water tap;
   a WC;
the passive entities comprise one or more of the following:
   the raw construction of the housing unit;
the passive components comprise one or more of the following:
   a foundation;
   an insulation, for example a thermal and/or acoustic insulation;
   a wall;
   a roof;
   a window;
   an outer door;
the one or more conduits comprise one or more of the following:
   a pipe;
   a wire;
   a cable;
   a tube; and/or
the one or more utilities comprise one or more of the following:
   water;
   electricity;
   heat;
   ventilation;
   information and communication technology.

According to a second aspect of the invention, there is provided a manufacturing and installation method for a housing unit according to the first aspect of the invention, wherein the method comprised the steps of:
manufacturing the lower plinth system and/or the upper plinth system, and the plurality of standard cupboard modules of a particular SAM super-entity at a manufacturing plant away from the installation site of the SAM super-entity;
installing the lower plinth system, the upper plinth system and the plurality of standard cupboard modules at the installation site of the particular SAM super-entity.

According to an embodiment there is provided a method, wherein the method comprises the further steps of:
during manufacturing of a particular SAM super-entity at the manufacturing plant:
   integrating the active components in the standard cupboard modules of the particular SAM super-entity;
   integrating, in the lower plinth system and/or the upper plinth system, the conduits for providing corresponding utilities to the corresponding active components;
during installation of the particular SAM super-entity at the installation site:
   installing the lower plinth system, upper plinth system and the plurality of cupboard modules
   coupling the conduits provided in the lower plinth system and/or the upper plinth system to their corresponding active components provided in the standard cupboard modules.

According to a further embodiment, there is provided a method, wherein the method comprises the further steps of a computer-implemented design method for designing a particular SAM super-entity for manufacture at the manufacturing plant, in which the computer implemented design method comprises the steps of automatically designing the upper and/or lower plinth systems and the conduits arranged therein in function of the arrangement of the plurality of cupboard modules and the plurality of active components arranged therein;

According to a further embodiment, there is provided a method, wherein the computer-implemented design method comprises the further step of automatically determining the positioning and shaping of the conduits, such that the conduits can be suitably arranged in the corresponding lower and/or upper plinth systems for providing the required utilities to the active components.

According to a further embodiment, there is provided a method, wherein the computer-implemented design method comprises the further step of automatically determining the length, shape and location of the conduits by making use of the following parameters:
the location of the source of the respective utilities; and
the location of the active components of the SAM super-entity requiring a coupling to a respective utility,
in such a way that the conduits respectively provide a required coupling between a respective source of the required utility and the corresponding active component.

According to a further embodiment, there is provided a method, wherein the method further comprises the steps of the computer-implemented design method comprising the further steps of:
receiving as input a customer project request;
accessing a library of design objects, a design object comprising a data structure representing an entity of the housing unit;
generating in function of the project request and the design objects of the library one or more of the following:
 a representation of the customer design;
 a manufacturing design or CAM for supporting the automated manufacturing method at the manufacturing plant;
 a bill of materials or BOM for supporting the automated assembly of the entities of the SAM super-entity at the manufacturing plant in subsequent steps of the manufacturing method, and further also installation instructions for use during a subsequent installation method at the installation site of the housing unit. As further shown, according to this embodiment the customer design, can then be used to support the input of customer acceptance after the on-site installation of the SAM super-entity.

According to a further embodiment, there is provided a method, wherein the design object corresponding to an entity of the housing unit is defined by one or more of the following parameters:
Physical parameters: length, height, depth;
Finish parameters: choices and quality of materials;
Equipment parameters.

BRIEF DESCRIPTION OF THE DRAWINGS

Exemplary embodiments will now be described in more detail with reference to the accompanying drawings, in which.

DETAILED DESCRIPTION OF EMBODIMENT(S)

1. General Introduction to the Invention Also Referred to as the SAM Concept 1.1. Terminology The SAM concept and design are based on a well-defined categorization of construction and functional objects. SAM is the acronym for Smart Adaptive Module. In this text, generally the following concepts are used in accordance with their definitions as provided below:
Component: an object that loses its function if further broken down, e.g. chair, door, bath, roof, sink, tab, radiator, etc.
Function: the role of a component, e.g. the function of a radiator, which is a component, is to provide heat.
Utility: a supply utility for providing water, electricity, heat, ventilation, information technology, telecom, etc.
Conduits: all the piping and wiring linked to the provision of the utilities via a corresponding active component, such as for example a bath, a tab, a radiator, etc.
Entity: an assembly of building components that has a coherent role, e.g. a kitchen, a bathroom, . . . .
Super-entity: a set of closely linked entities. The SAM super-entity also referred to as SAM module, SAM concept or smart core, which comprises a plurality of such entities, such as a kitchen, bathroom, etc. is such a super-entity.
Design object: a digitized (software) model of an entity.

Typically in the following description, the above mentioned concepts, when they get a particular meaning within the concept of the invention, also referred to as the SAM-concept, typically the prefix 'SAM' will be used, such as for example a SAM-entity refers to an entity of the SAM super-entity as will be explained in further detail below.

1.2. Main Objectives

The main objectives behind the development of the SAM concept stems from two questions about the prior art construction of residential buildings. The first question is conceptual: how can one partition a fully fitted house into parts that allow to maximize efficiency with respect to building materials and thereby also maximize cost savings and returns?

Figure 1:
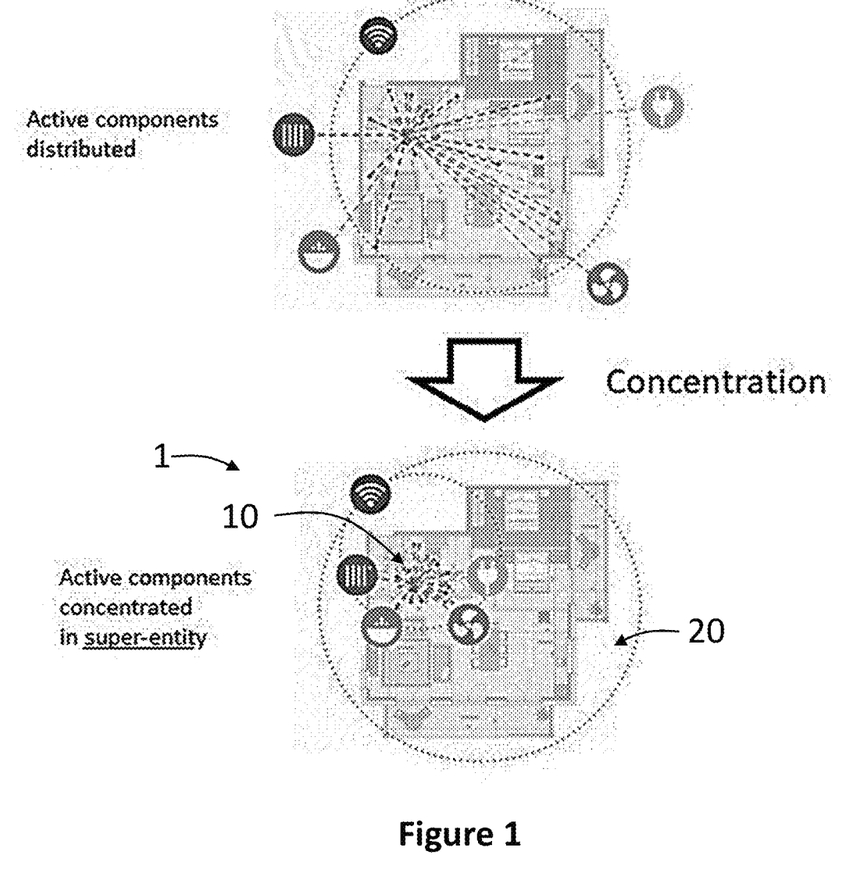
FIG. 1 schematically shows an embodiment of the housing unit according to the invention in contrast to that of the prior art.

A housing unit 1 can be partitioned into two sets of entities; passive entities, e.g. simple entities such as walls with doors, windows, etc.; and active entities, e.g. a fully equipped kitchen and bathroom, distribution of utilities, etc., which are often more complex entities. As shown in FIG. 1, with ease of construction in mind, it is recommended to concentrate those active entities as much as possible in a single super-entity, also referred to as the SAM super-entity 10. FIG. 1 illustrates the level of concentration of active entities or components which are linked to distribution of utilities such as wireless internet, ventilation, water, heating and electricity of a prior art distributed concept as illustrated in the top section, as compared to the SAM super-entity 10 which comprises all these active entities or components as shown in the bottom section, and thereby thus concentrates all these active entities as will described in further detail below.

Figure 2A:
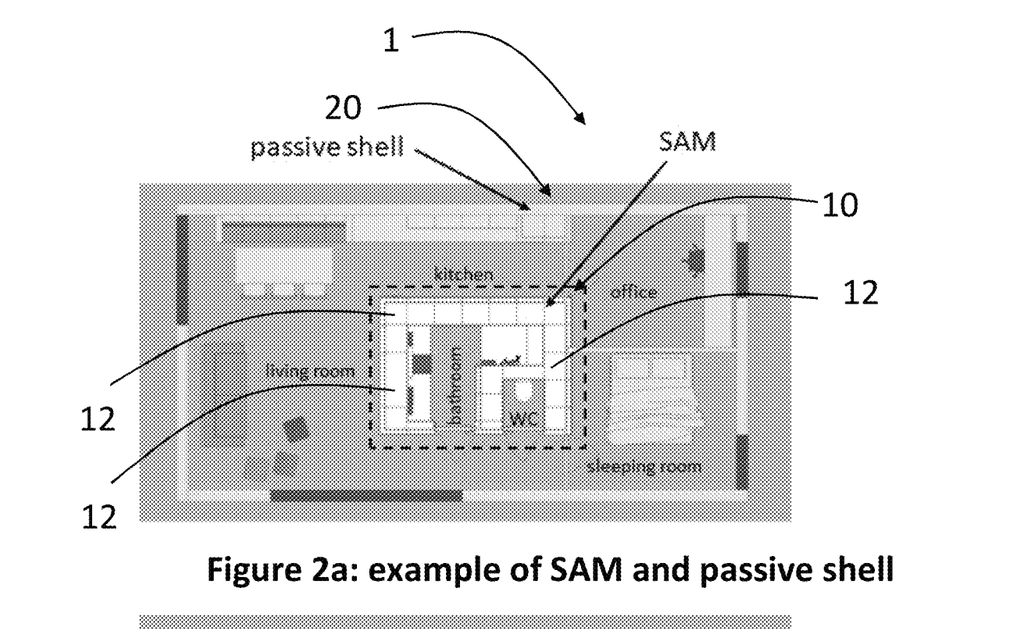
FIGS. 2a, 2b and 3, show embodiments of the housing unit in further detail.

As shown in more detail in FIG. 2a, the passive entities are grouped in a super-entity called the passive shell 20. Typically, this passive shell 20 corresponds with the raw construction of the building, such as for example the walls, roof, windows, outer doors, foundations, insulation, for example thermal and/or acoustic insulation, etc. As further shown, according to the embodiment of FIG. 2a, the active entities are all provided in the SAM super-entity 10. As shown, the SAM super-entity 10, comprises a lower plinth system 14 and an upper plinth system 16, which will be described in further detail below. In between this lower and upper plinth system 16 the SAM super-entity 10 comprises a plurality of standard cupboard modules 12. It is clear that the overall height of these cupboard modules 12 corresponds to the distance between the lower and upper plinth systems 14, 16. The width and depth of these cupboard modules 12 is standardized and corresponds to a predetermined standard distance, typically in the range of 0.3 m to 1 m, for example 0.5 cm or 0.6 cm. Alternatively, the width and depth of these cupboard modules 12 could also be an integer multiple of this predetermined standard distance. The structure of the SAM super-entity is thus built from such modular multi-functional cupboard modules 12.

It is clear that the housing unit 1 can comprise still further entities and/or components in addition to the SAM super-entity 10 and the passive shell 20. For example, according to the embodiment shown in FIG. 2a, the passive shell super-entity 20 for example comprises components such as the walls, roof, windows, outer doors, etc. The SAM super-entity 10 provides all active entities for the internal entities of the housing unit 1, such as the kitchen, bathroom, etc. This means the internal entities, which are rooms defined by the interior walls are provided with the functionality of the active components of the SAM super-entity 10, such as for example the utilities, such as water, electricity, heating, ventilation and information and communication technology. Further the SAM super-entity also provides for the fixed furniture components of these internal entities by means of the cupboard modules 12. However it is clear that the housing unit 1 could for example further also comprise further entities and components such as for example loose furniture such as for example tables, chairs, beds, etc. which are neither part of the passive shell 20, nor the SAM super-entity 10.

A further objective relates to the question about the manufacturing process of the housing unit 1. How can the aforementioned SAM super-entity 10 be made in the most efficient way? In other words, when an optimal set of functions has been determined for a particular embodiment of the SAM super-entity 10, how can that embodiment of the SAM super-entity be manufacture and assemble its parts as efficiently as possible? The objective therefore lies in finding a way to make a SAM super-entity that can easily be assembled on-site without sacrificing flexibility and aesthetics. As will be explained in further detail below, the SAM super-entity 10, provides for integration of a plurality of active components, however it is ensured that that technical fittings of conduits of utilities no longer have to be installed on-site but merely connected. In this way there is provided a sort of plug and play system for the active components of the SAM super-entity 10.

2. The SAM Super-Entity Manufacturing and Design Method

2.1. Targeted Problems

In the traditional way of constructing houses, such as shown in the upper part of FIG. 1, one encounters a number of inefficiencies, mainly due to wasteful installation of conduits for providing utilities. Known problems relate for example to:

- The need to embed wiring and piping into newly built walls;
- The need to run ventilation pipes through walls;
- The difficulty to access conduits of utilities embedded into the structure of the building, which makes repairs, modification and/or deconstruction difficult and work intensive.
- The significant amount of on-site rework and excess material typically required in order to cope with uncertainties due to insufficient planning and/or coordination between the different construction phase of the housing unit.
- The need for significant cross disciplinary communication leading to complex installation and work coordination during construction and maintenance of the housing unit.

2.2. Proposed Solutions, By Means of the Corresponding Manufacturing and Installation Method of the SAM Super-Entity In order to tackle these issues, the proposed advantageous manufacturing and installation method provides the following advantages, by means of an optimal hybrid approach manufacturing and installation method. According to the manufacturing and installation method there is firstly chosen to do a substantial part of the manufacturing and installation work at the factory where the manufacturing of a plurality of such SAM super-entities can at least partly be provided for, away from the actual construction site where the SAM super-entity can be installed in the housing unit. The way of achieving this is by integrating all the utilities and their corresponding active components into the SAM super-entity 10. As mentioned above, according to the embodiments shown in FIGS. 1 and 2a the utilities such as water, electricity, heating, ventilation, information and communication technology, and preferably all the corresponding conduits for their corresponding active components such as the bath, oven, HVAC unit, internet router, etc. are all integrated into a single SAM super-entity 10, that also comprises the active entities such as the kitchen, the bathroom, etc. In this way the manufacturing of these active entities can be done away from the installation site, at a suitable manufacturing plant. This allows to provide for a manufacturing of a plurality of such SAM super-entities 10 at a manufacturing plant, which provides at least for the following advantages:

- A reduced risk for errors and downtime as the manufacturing work is executed by a consistent group of professionals and is not affected by external uncontrollable circumstances, such as interference with other ongoing construction activities and the weather at the location of the installation site;
- An increased level of automation can be provided when manufacturing a plurality of the components for the SAM super-entities.

An optimization of the use of materials by more easily limiting waste.

A more efficient manufacturing as economies of scale can more easily be obtained.

It is clear that also the installation method at the installation site of the SAM super-entity 10 can be simplified and standardized. As, during manufacturing of a particular SAM super-entity 10 at the manufacturing plant all active components are provided in the standard cupboard modules 12 of a particular SAM super-entity 10; and the conduits for providing corresponding utilities to the corresponding active components are provided in the lower plinth system 14 and/or the upper plinth system 16, the installation method of that particular SAM super-entity can be simplified. As both the conduits for the utilities and the active components are, during installation integrated into one single SAM super-entity, the installation itself becomes a mere "plug-and-play" operation. The installation method for the particular SAM super-entity 10 can simply be performed at the installation site by installing the lower plinth system 14, upper plinth system 16 and the plurality of cupboard modules 12; and coupling the conduits provided in the lower plinth system 14 and/or the upper plinth system 16 to their corresponding active components provided in the standard cupboard modules 12. Such a simpler installation method allows also for a more reliable estimate of the required time period for completing the on-site installation of a particular SAM super-entity, and reduces the need for different installation contractors needing specific technical know-how related to the different utilities. In this way efficiency can be increased and costs can be lowered as less on-site installation work is required and the manufacturing can be realized in a manufacturing plant where suitable automated production techniques can be made available. Further, because of the less complex installation there is a lower risk for errors, which leads to a higher level of quality. Additionally, the use of installation tools and further installation materials to be provided on-site are drastically reduced and can almost be eliminated. It is further clear from the above that the efficiency is further improved as the time period required for executing the installation method can be minimized as the installation process is a simplified 'plug-and-play' operation and the full installation process can be done by a single operator without requiring in depth knowledge of the installation techniques of each of the utilities and the corresponding conduits and active components.

Figure 3:
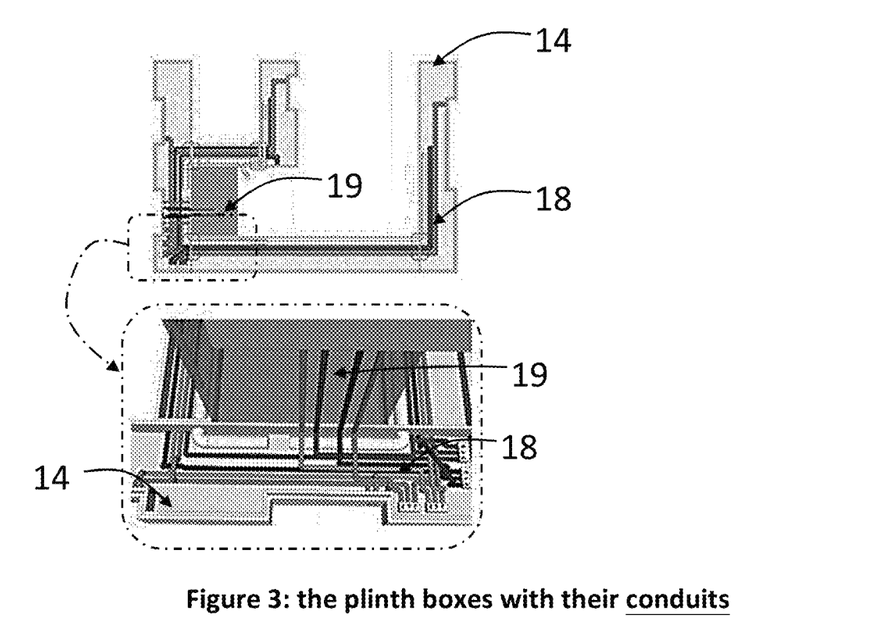

2.3. Advantageous Features of Exemplary Embodiments of the Sam Super-Entity and Its Related Manufacturing and Installation Method An embodiment of the lower plinth system 14 of an embodiment of the SAM super-entity is shown in more detail in FIG. 3 which shows a top view of this lower plinth system 14 and an enlarged perspective view of a corresponding fragment of this top view. As shown, the lower and/or upper plinth system can be considered as the backbone or the spinal cord of the embodiment of the SAM super-entity 10. According to the embodiment shown, all the conduits 18, this means all suitable pipes, wires, cabling, tubes, etc. for providing utilities to the corresponding active components are arranged in the lower plinth system 14 and/or the upper plinth system 16. According to the particular embodiment shown, the lower plinth system 14 comprises for example all conduits 18 relating to the piping for sanitation and heating, as well as the majority of the electrical wiring and some ventilation tubes. According to this particular embodiment the upper plinth system 16 for example comprises the conduits 18 relating to the tubes associated with an active component of the ventilation system and the electrical wiring associated with an active component of the lighting system for the surrounding living spaces. It is preferable, for maintenance purposes, that all conduits 18 remain easily accessible even after installation. According to an exemplary embodiment, they can remain accessible via small hatches at the bottom of certain cupboard modules 12, however it is clear that alternative embodiments are possible. In this way easy maintenance remains assured, and it also allows for easy updates or replacements to the conduits in function of for example modifications of the required or available utilities and/or modifications relating to the active components coupled to these conduits 18. As further shown in FIG. 3, according to this embodiment, the conduits 18 of the lower plinth system 14 are coupled to conduits arranged in a technical area 19, which for example comprises a technical installation from which the utilities are supplied to the housing unit 1. Optionally this technical area 19, according to the embodiment shown, could also function as a duct for coupling any of the conduits 18 arranged in the lower plinth system 14 to conduits 18 arranged in the upper plinth system 16 if desired.

A preferred embodiment of the manufacturing and installation method for the housing unit, more particularly with respect to the lower plinth system 14 and/or the upper plinth system 16 will now be described in further detail below. During a first step of the manufacturing method, there is provided a computer implemented design method in which the upper and/or lower plinth systems 14, 16 and the conduits 18 are designed digitally in function of the digital design of the entire SAM super-entity 10 and more particularly the arrangement of the plurality of cupboard modules 12 and the plurality of active components integrated therein. This computer implemented design method will be described in further detail below. During a subsequent step, preferably the positioning and shaping of the conduits is automatically determined by means of a suitable computer-implemented method such that they can be suitably integrated in the corresponding lower and/or upper plinth system 14, 16 of the SAM super-entity 10 for providing the required utilities to the active components. It is clear that, when the digital design of the lower and upper plinth system 14, 16 in function of the arrangement of the cupboard modules 12 of the SAM super-entity 10 has been determined, and when for example the location of the technical installations comprising a suitable source for the utilities for the conduits and the location of the active components which need to be coupled by the conduits to a suitable source of the corresponding utility has been determined, that then the position of the conduits can be automatically determined in such a way that the conduits couple the active components to the required utility and the conduits 18 follow a path which is suitably positioned at least partly within the lower and/or upper plinth system 14, 16. It is clear that preferably this is realized by means of an automated computer implemented method, for example by making use of parameters of the SAM super-entity 10 which allow to automatically determine required couplings by means of the conduits 18 in between the location of the source of a utility, for example in a technical service area 19 of the SAM super-entity and the location of the active component of the SAM super-entity requiring a coupling to that utility. In this way, preferably the length, shape, required bends, etc. of all the conduits of a particular SAM super-entity 10 can be pre-determined. During a subsequent step of the manufacturing method, the lower and/or upper plinth system 14, 16 can be manufactured in a manufacturing plant, remote from the installation site. During a subsequent step the lower and/or upper plinth system 14, 16 is manufactured at the manufacturing plant, remote from the installation site. Preferably the plinth systems are manufactured and/or assembled at least partly automatically, and each plinth system is manufactured in function of and subsequently linked to a particular corresponding SAM super-entity 10 as described above. During a subsequent step, when a particular SAM super-entity 10 needs to be transported to the installation site of the housing unit 1, the corresponding lower and/or upper plinth systems 14, 16 are retrieved and packaged separately from the cupboard modules 18 of the SAM super-entity 10. Preferably, the lower and/or upper plinth systems 14, 16 are packaged and transported with their respective conduits 18 already installed. During a subsequent step of this embodiment the installation of the upper and/or lower plinth systems 14, 16 is performed on-site. By means of proper marking and clear installation instructions the lower and upper plinth system 14, 16, which preferably have already been provided with their conduits can easily be installed by low-skill installers.

Figure 2B:
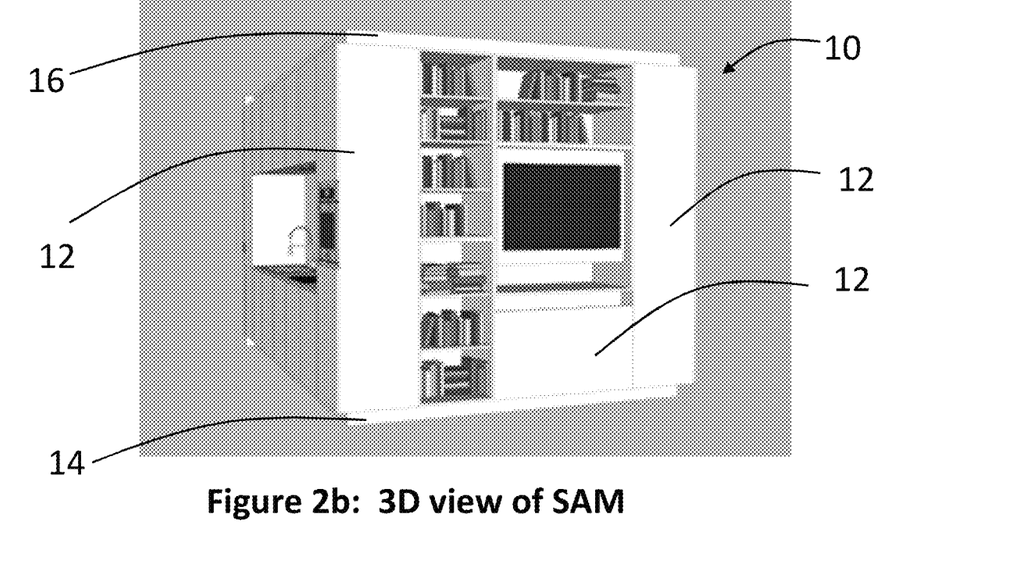

According to a preferred embodiment, such as for example shown in FIGS. 2a and 2b, the SAM super-entity 10 comprise active entities such as the kitchen and, in the center, the bathroom and WC. As shown, this means that the cupboard modules 12 of the SAM super-entity 10 function as interior walls of the housing unit 1. As further shown, according to this embodiment, when placing a SAM super-entity 10 in the middle of the living space of the housing unit, this results in the fact that the number of interior walls can be reduced or according to some embodiments even eliminated. The cupboard modules 12 thus become the interior walls of the housing unit 1. This is also advantageous as it still further reduces the amount of on-site work at the installation site. Preferably, suitable materials are chosen in function of cupboard modules 12 which border rooms with an elevated level of humidity, such as for example the bathroom.

3. An Embodiment of a Computer-Implemented SAM Super-Entity Design Method

Figure 4:
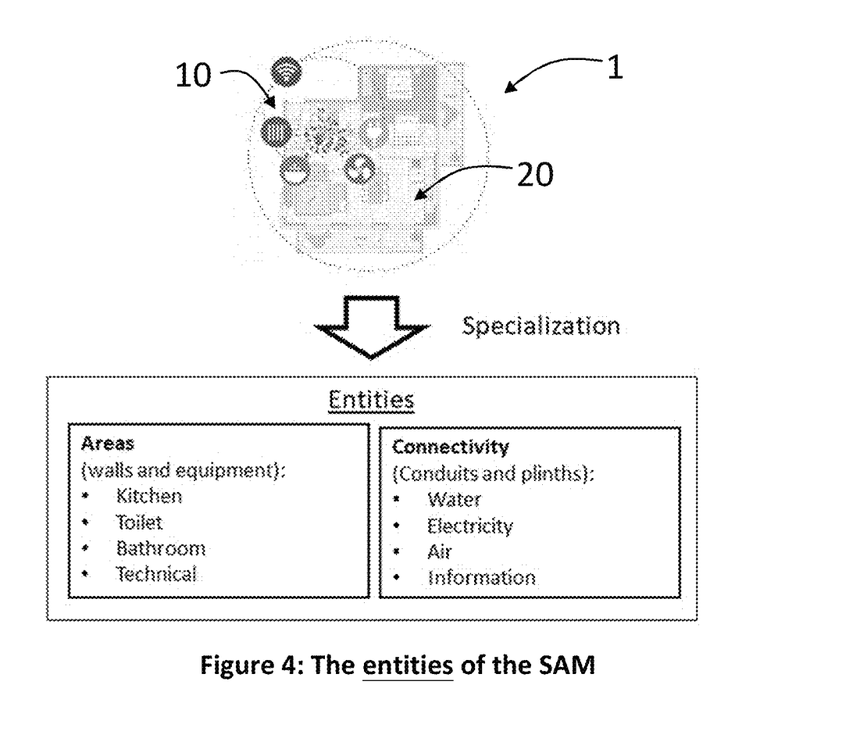
FIGS. 4 and 5 show embodiments of a method for designing, manufacturing and installing such a housing unit.

As already mentioned above, in general the SAM super-entity 10 concentrates all complex active functions of active components of the active entities of a housing unit in a single SAM super-entity 10. According to a preferred computer-implemented design method, the design of the SAM super-entity is facilitated by means of an intermediate design step during which particular entities are defined. As for example shown in the embodiment of FIG. 4, such entities are for example one or more of the following areas entities defining an active entity, such as for example defined by their walls and/or dedicated equipment: a kitchen, a restroom or toilet, a bathroom, a technical area, etc. Further embodiments of entities could for example be defined as connectivity entities. Such connectivity entities define for example the conduits 18 arranged in the lower and/or upper plinth system 14, 16 for providing the connectivity with the corresponding utilities to the active components arranged in the active entities. As shown, according to the embodiment of FIG. 4, the partitioning of each entity results in a set of areas entities and connectivity entities. Each entity is preferably represented by a suitable data structure, such that it can be processed by the computer implemented design method as a dedicated design object.

3.1. Configurable Design Objects Linked to Entities

According to a preferred embodiment, each entity of the SAM super-entity 10 comprises its corresponding dedicated design object defined by one or more parameters, such as for example:
Physical parameters: length, height, depth, . . . .
Finish parameters: choices and quality of materials, . . . .
Equipment parameters: sink, bath, shower, tabs, heating equipment, etc. or any other suitable choices of equipment specifications.

Preferably, each design object also satisfies following criteria, which are imposed by the computer-implemented design method:
It comprises a fully digitized model, which provides for a description or data structure that is machine readable and which can be automatically processed by a suitable computer-implemented design method.
The physical parameters preferably ensure the required modularity, by for example assuring a length and width or depth of a predetermined distance, such as for example 60 cm or an integer multiple thereof.
A data structure which supports re-useable in new design objects, for example representing future designs, thereby facilitating the efficient creation of new design objects for example by means of inheritance, or other suitable mechanisms which allow re-use of previously created digital data structures.
A data structure which is suitable for automatic linking with manufacturing software such as for example a suitable Computer Aided Manufacturing application or CAM to support the automated manufacturing method of the entities corresponding to these design objects.

Figure 5:
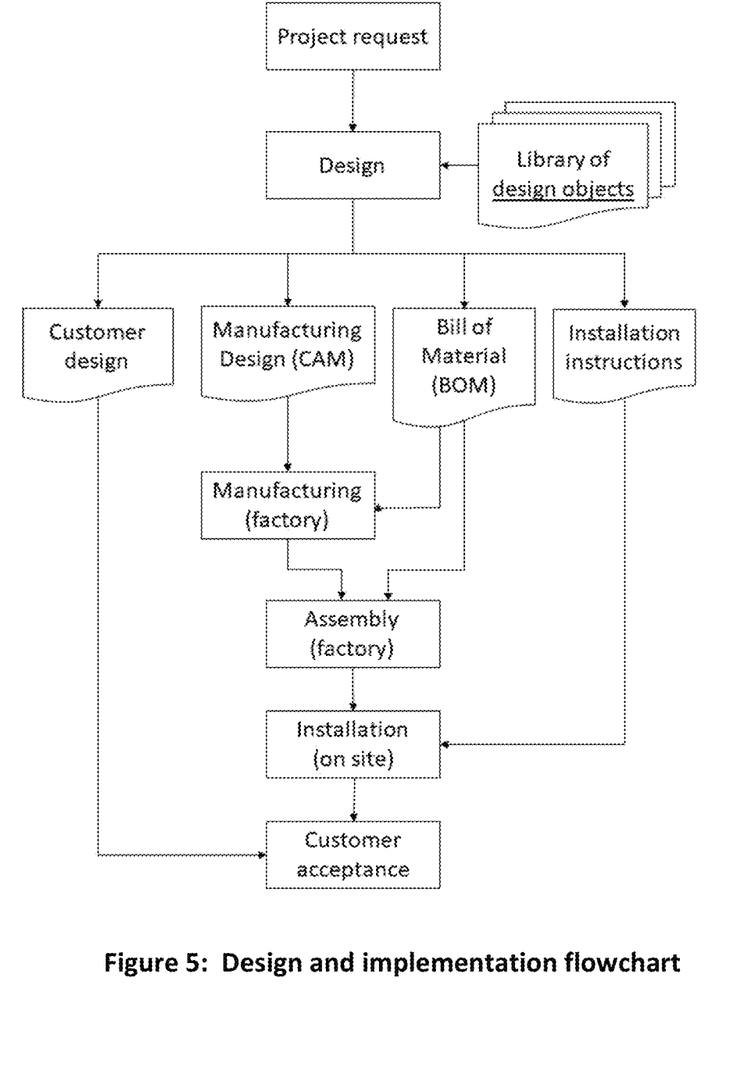

3.2. An Embodiment of the Computer-Implemented SAM Super-Entity Design Method FIG. 5 shows an embodiment of the computer-implemented SAM super-entity design method. As shown the computer-implemented design method is initiated by an input of a customer project request, which for example defines the required entities for the housing unit as desired by the customer. At a subsequent step the computer-implemented design method is executed making use of a library comprising a plurality of predefined design objects, such as described above. This computer-implemented design method is subsequently continued by an almost instantaneous and automatic generation of several outputs such as a representation of the customer design, a manufacturing design or CAM and a bill of materials or BOM to support the automated manufacturing and assembly of the entities of the SAM super-entity at the manufacturing plant in subsequent steps of the manufacturing method, and further also installation instructions for use during a subsequent installation method at the installation site of the housing unit 1. As further shown, according to this embodiment the customer design, can then be used to support the input of customer acceptance after the on-site installation of the SAM super-entity. It is clear that alternative embodiments are possible, however preferably the computer-implemented design of a SAM super-entity is realized by means of the assembly of a predetermined number of parameterized design objects corresponding to entities such as a kitchen, a bathroom, a toilet, a technical area, lower and/or upper plinth systems preferably comprising conduits, . . . . As shown, according such a preferred embodiment the usage of predefined design objects, which are linked to their corresponding entities, stored in a suitable library, for example implemented as a suitable database or any other suitable storage structure, makes it possible to achieve shorter design cycles and manufacturing cycles for example in the range of a few minutes to hours depending on the complexity of the SAM. It should be clear that the automated design of the lower and/or upper plinth systems 14, 16, comprising its corresponding conduits is one of the factors which contributes to the efficiency of the design, manufacturing and installation method. Preferably, all exchange of data mentioned above is automated, by means of suitable digital interfaces, such that manual recapturing of data can be avoided. It is further also clear that preferably the installation method is strictly limited to the assembly of the different cupboard modules 12 with the lower and/or upper plinth systems 14, 16 as manufactured and assembled in the manufacturing plant. In this way the need for specialized manpower at the installation site is avoided.

4. Further Optional Features of the SAM Super-Entity

It is clear that still further alternative embodiments are possible of the SAM super-entity 10 in which the concentrated design supports some advantageous features.

4.1 HVAC: An Embodiment of the SAM Super-Entity Could Function as an Integrated HVAC Unit for the Housing Unit A housing unit preferably comprises heating, ventilation and a form of air conditioning or HVAC in order to provide a comfortable living environment. An embodiment of the SAM super-entity comprises heating and ventilation and optionally air conditioning. Such an embodiment in which heating, ventilation and air conditioning is concentrated in a single super-entity, could also function, when packaged into one assembly as an integrated HVAC thermodynamic system when coupled to a suitable control system. Preferably this control system comprises suitable algorithms to steer the ambient parameters to increase comfort and reduce energy costs.

4.2. A Suitable Control System for Allowing Building Automation

According to a particular embodiment the SAM super-entity could comprise a suitable control system for controlling the available parameters of a Building Automation system of residential housing units. This means that the Building Automation system comprises a control system, suitably coupled to the SAM super-entity is able to give the inhabitants control over heating, lighting, ventilation and security in their housing unit. According to still a further embodiment, when coupling a plurality of such SAM super-entities to a suitable building management system, this allows managers, owners, maintainers, . . . of the plurality of housing units, for example as comprised in an apartment building to view the performance and usage of each individual SAM unit and of the building comprising a plurality of such SAM super-entities itself by means of a suitable user interface of a suitable software platform.

4.3. Use of a SAM Super-Entity During Renovation of an Existing Housing Unit It is clear from the installation method described above, as the plinth systems and the cupboard modules are assembled on site, that the SAM super-entities, also referred to as SAM units, can also be installed in existing buildings, for example in the context of renovation projects. This thus means that an existing or old housing unit and/or a building comprising a plurality of housing units in this way can be easily converted to a smart housing unit or building. As already mentioned above the conduits for the facilities such as electricity, water, heating, air, etc. and the corresponding active components are all arranged in elements of the SAM super-entity itself. There is thus no need to install, arrange or embed any of these elements into the structure of the existing housing unit or building.

Figure 6:
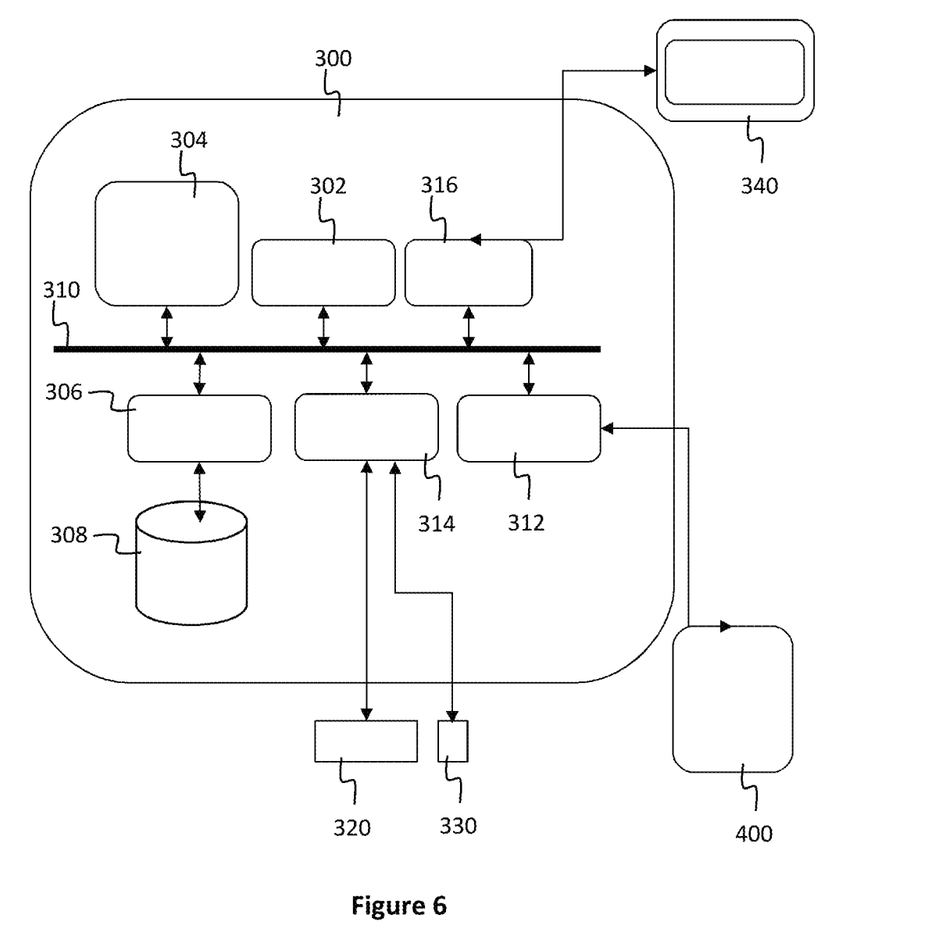
FIG. 6 shows an embodiment of a suitable computing system for executing the computer-implemented design method.

FIG. 6 shows a suitable computing system 300, 400 for hosting the computer-implemented method or any of its components as described with reference to the abovementioned embodiments. Computing system 300 may in general be formed as a suitable general purpose computer and comprise a bus 310, a processor 302, a local memory 304, one or more optional input interfaces 314, one or more optional output interfaces 316, a communication interface 312, a storage element interface 306 and one or more storage elements 308. Bus 310 may comprise one or more conductors that permit communication among the components of the computing system. Processor 302 may include any type of conventional processor or microprocessor that interprets and executes programming instructions. Local memory 304 may include a random access memory (RAM) or another type of dynamic storage device that stores information and instructions for execution by processor 302 and/or a read only memory (ROM) or another type of static storage device that stores static information and instructions for use by processor 302. Input interface 314 may comprise one or more conventional mechanisms that permit an operator to input information to the computing device 300, such as a keyboard 320, a mouse 330, a pen, voice recognition and/or biometric mechanisms, etc. Output interface 316 may comprise one or more conventional mechanisms that output information to the operator, such as a display 340, a printer, a speaker, etc. Communication interface 312 may comprise one or more transceiver-like mechanisms such as for example two 1 Gb Ethernet interfaces that enables computing system 300 to communicate with other devices and/or systems, for example mechanisms for communicating with one or more other computing systems 400. The communication interface 312 of computing system 300 may be connected to such another computing system 400 by means of a local area network (LAN) or a wide area network (WAN), such as for example the internet. Storage element interface 306 may comprise a storage interface such as for example a Serial Advanced Technology Attachment (SATA) interface or a Small Computer System Interface (SCSI) for connecting bus 310 to one or more storage elements 308, such as one or more local disks, for example 1 TB SATA disk drives, and control the reading and writing of data to and/or from these storage elements 308. Although the storage elements 308 above is described as a local disk, in general any other suitable computer-readable media such as a removable magnetic disk, optical storage media such as a CD or DVD, -ROM disk, solid state drives, flash memory cards, . . . could be used.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein. This is especially the case for the embodiments described above which refer to a single SAM super-entity. It is clear that these embodiments are disclosed in a manner sufficiently clear and complete for a skilled person to apply that teaching to embodiments making use of two or more SAM super-entities. It is further clear that, in addition to the functionalities of the embodiments mentioned above, according to still further embodiments, the SAM super-entity could optionally comprise additional functionalities such as for example features aimed at an improved energy efficiency, domotics elements, safety features, etc. It is further also clear that the concepts and embodiments described above could be fine-tuned to specific applications, such as for example low-energy or passive housing units, etc., and/or for specific target groups, such as for example housing units for students, elderly, etc.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", "lower", "upper" and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A manufacturing and installation method for a housing unit comprising a first super-entity, a SAM super-entity, which comprises active entities and/or active components,
   wherein the SAM super-entity comprises a lower plinth system, and/or an upper plinth system, and further comprises a plurality of standard cupboard modules arranged between the lower plinth system and/or the upper plinth system which form the structure of the SAM super-entity, wherein the method comprises the steps of:
   manufacturing the lower plinth system and/or the upper plinth system, and the plurality of standard cupboard modules of a particular SAM super-entity at a manufacturing plant away from an installation site of the particular SAM super-entity;
   installing the lower plinth system and/or the upper plinth system and the plurality of standard cupboard modules at the installation site of the particular SAM super-entity;
   designing a particular SAM super-entity for manufacture at the manufacturing plant using further steps of a computer-implemented design method, in which the computer implemented design method comprises the steps of automatically designing the upper and/or lower plinth systems and conduits arranged therein in function of the arrangement of the plurality of standard cupboard modules and the corresponding active entities and/or active components arranged therein.

2. The method according to claim 1, wherein the method comprises the further steps of:
   during manufacturing of the particular SAM super-entity at the manufacturing plant:
   integrating the active entities and/or the active components in the plurality of standard cupboard modules of the particular SAM super-entity;
   integrating, in the lower plinth system and/or the upper plinth system, the conduits for providing corresponding utilities to the corresponding active entities and/or active components; and
   during installation of the particular SAM super-entity at the installation site:
   installing the lower plinth system and/or the upper plinth system and the plurality of standard cupboard modules;
   coupling the conduits provided in the lower plinth system and/or the upper plinth system to their corresponding active entities and/or active components provided in the plurality of standard cupboard modules.

3. The method according to claim 1, wherein the computer-implemented design method comprises the further step of automatically determining a positioning and shaping of the conduits, such that the conduits can be suitably arranged in the corresponding lower and/or upper plinth systems for providing required utilities to the active entities and/or the active components.

4. The method according to claim 3, wherein the computer-implemented design method comprises the further step of automatically determining a length, shape and location of the conduits by making use of the following parameters:
   a location of a source of the respective utilities; and
   a location of the active components of the particular SAM super-entity requiring a coupling to the respective utility,
   in such a way that the conduits respectively provide a required coupling between the respective source of the required utility and the corresponding active entity and/or active component.

5. The method according to claim 3, wherein the computer-implemented design method comprises the further steps of:
   receiving as input a customer project request;
   accessing a library of design objects, each design object comprising a data structure representing an entity of the housing unit;
   generating in function of the customer project request and the design objects of the library one or more of the following:
   a representation of a customer design;
   a manufacturing design or CAM for supporting an automated manufacturing method at the manufacturing plant;
   a bill of materials or BOM for supporting an automated assembly of the active entities and/or active components of the particular SAM super-entity at the manufacturing plant in subsequent steps of the manufacturing method, and further also installation instructions for use during a subsequent installation method at the installation site of the housing unit.

6. The method according to claim 5, wherein the design object corresponding to an entity of the housing unit is defined by one or more of the following parameters:
   Physical parameters: length, height, depth;
   Finish parameters: choices and quality of materials;
   Equipment parameters.

* * * * *